(12) United States Patent
Sung et al.

(10) Patent No.: US 9,362,767 B2
(45) Date of Patent: Jun. 7, 2016

(54) PORTABLE WIRELESS COMMUNICATION DEVICE

(71) Applicant: Chiun Mai Communication Systems, Inc., New Taipei (TW)

(72) Inventors: Kun-Lin Sung, New Taipei (TW); Ting-Chih Tseng, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 109 days.

(21) Appl. No.: 14/467,924

(22) Filed: Aug. 25, 2014

(65) Prior Publication Data

US 2015/0065204 A1      Mar. 5, 2015

(30) Foreign Application Priority Data

Aug. 27, 2013   (CN) .................. 2013 1 0376840

(51) Int. Cl.
| | |
|---|---|
| *H04B 1/38* | (2015.01) |
| *H02J 7/00* | (2006.01) |
| *H04Q 1/44* | (2006.01) |
| *H04B 1/3827* | (2015.01) |
| *H01Q 1/27* | (2006.01) |
| *H01Q 1/44* | (2006.01) |

(52) U.S. Cl.
CPC .............. *H02J 7/0045* (2013.01); *H01Q 1/273* (2013.01); *H01Q 1/44* (2013.01); *H04B 1/385* (2013.01); *H04B 2001/3855* (2013.01); *H04B 2001/3861* (2013.01)

(58) Field of Classification Search
CPC .............. H02J 7/0045; H02J 7/00; H02J 7/36; H04B 1/385; H04B 2001/3861; H04B 2001/3855; H04B 1/38; H01Q 1/44; H01Q 1/273; H01Q 1/00; H01Q 11/20; A61B 5/681; A63B 24/0062; A63B 71/0622; G04G 17/045; G04G 17/08; G04G 21/025
See application file for complete search history.

(56) References Cited

U.S. PATENT DOCUMENTS

| | | | | |
|---|---|---|---|---|
| 8,442,588 | B2 * | 5/2013 | Sims ...................... | H01R 11/00 359/196.1 |
| 8,562,489 | B2 * | 10/2013 | Burton .................... | G04F 10/00 482/1 |
| 8,964,364 | B2 * | 2/2015 | Abdelsamie .......... | G06F 1/1628 361/679.03 |
| 9,122,250 | B2 * | 9/2015 | Hoffman ................ | G04F 10/00 |
| 9,142,874 | B2 * | 9/2015 | Wu ....................... | H01Q 1/2275 |
| 2011/0059769 | A1 * | 3/2011 | Brunolli ................ | G08C 17/02 455/556.1 |
| 2011/0244728 | A1 * | 10/2011 | Chang ................... | H01R 31/06 439/628 |
| 2013/0106603 | A1 * | 5/2013 | Weast .................... | G06F 1/163 340/539.11 |

(Continued)

FOREIGN PATENT DOCUMENTS

| | | |
|---|---|---|
| JP | 2010-286 A | 1/2010 |
| JP | 2011-259193 A | 12/2011 |

(Continued)

*Primary Examiner* — Pablo Tran
(74) *Attorney, Agent, or Firm* — Novak Druce Connolly Bove + Quigg LLP

(57) ABSTRACT

A portable wireless communication device includes a connector configured to charge the portable wireless communication device by electronically connecting a power source to the portable wireless communication device. The connector includes a plurality of pins, one of the pins configured to serve as a radiation portion of an antenna to receive/send wireless signals when the connector electronically is uncoupled to the power source.

18 Claims, 5 Drawing Sheets

(56) References Cited

U.S. PATENT DOCUMENTS

| | | | |
|---|---|---|---|
| 2014/0085815 A1* | 3/2014 | Filipovic | H04B 1/3888 361/679.56 |
| 2014/0375246 A1* | 12/2014 | Boysen, III | H02J 5/005 320/101 |
| 2015/0040669 A1* | 2/2015 | Borkholder | A61B 5/002 73/514.35 |
| 2015/0230049 A1* | 8/2015 | Huang | G01C 21/3688 455/456.3 |
| 2015/0297145 A1* | 10/2015 | Luna | A61B 5/7278 600/301 |

FOREIGN PATENT DOCUMENTS

| | | | | |
|---|---|---|---|---|
| JP | 2011259193 A | * | 12/2011 | H01Q 1/44 |
| JP | 2012-52407 A | | 3/2012 | |
| JP | 2012052407 A | * | 3/2012 | E05B 49/00 |
| WO | 2012/061440 A3 | | 8/2012 | |

* cited by examiner

PORTABLE WIRELESS COMMUNICATION DEVICE

FIELD

The subject matter herein generally relates to portable wireless communication devices, and particular to a portable wireless communication device having a connector.

BACKGROUND

With improvements in the integration of wireless communication systems, antennas have become increasingly important. For reduction in size of the portable wireless communication device, antennas having small size have become a significant technology.

BRIEF DESCRIPTION OF THE DRAWINGS

Implementations of the present technology will now be described, by way of example only, with reference to the attached figures.

DETAILED DESCRIPTION

Figure 1:
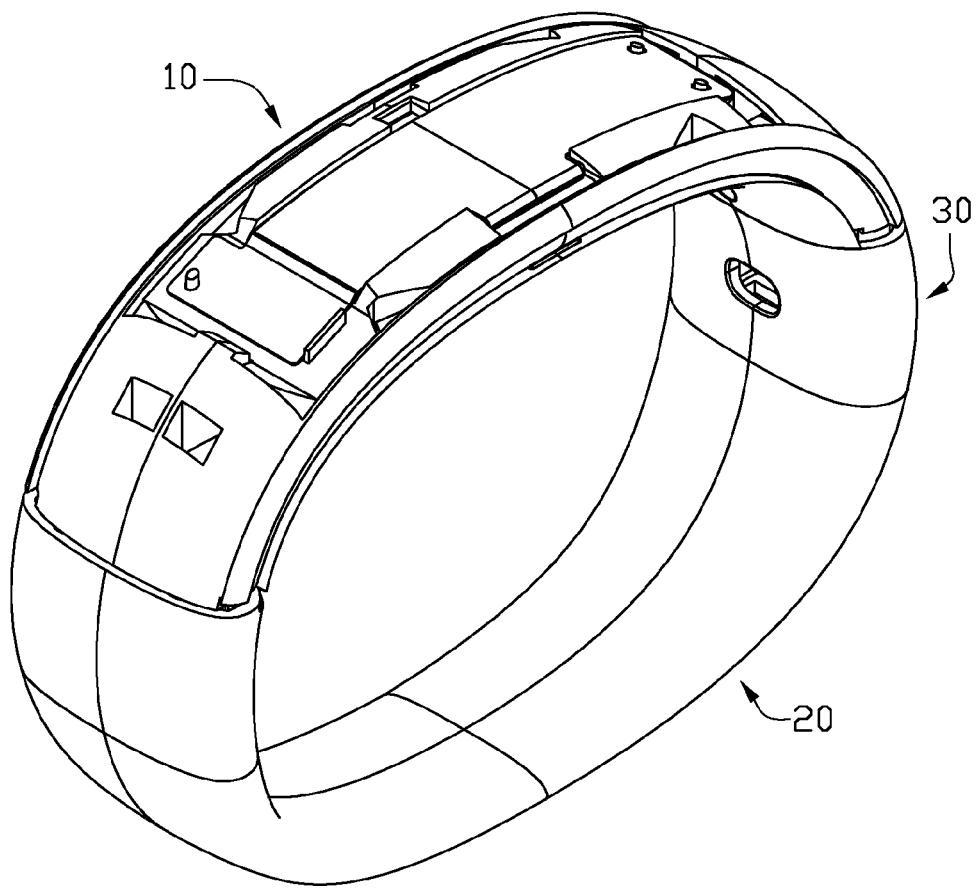
FIG. 1 is an isometric view of one embodiment of a portable wireless communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

FIG. 1 illustrates an isometric view of one embodiment of a portable wireless communication device 100. In the exemplary embodiment, the portable wireless communication device 100 is a wrist watch having wireless communication function. However, the portable wireless communication device 100 is not limit by the instant example. For example, the wireless communication 100 can be a wearable device, such as a Bluetooth headset.

The portable wireless communication device 100 includes a main body 10, a strap 20, and two connecting portions 30. The two connecting portions 30 detachably mounted to two ends of the main body 10 respectively. The strap 20 is detachably coupled to the two connecting portions 30 respectively.

Figure 2:
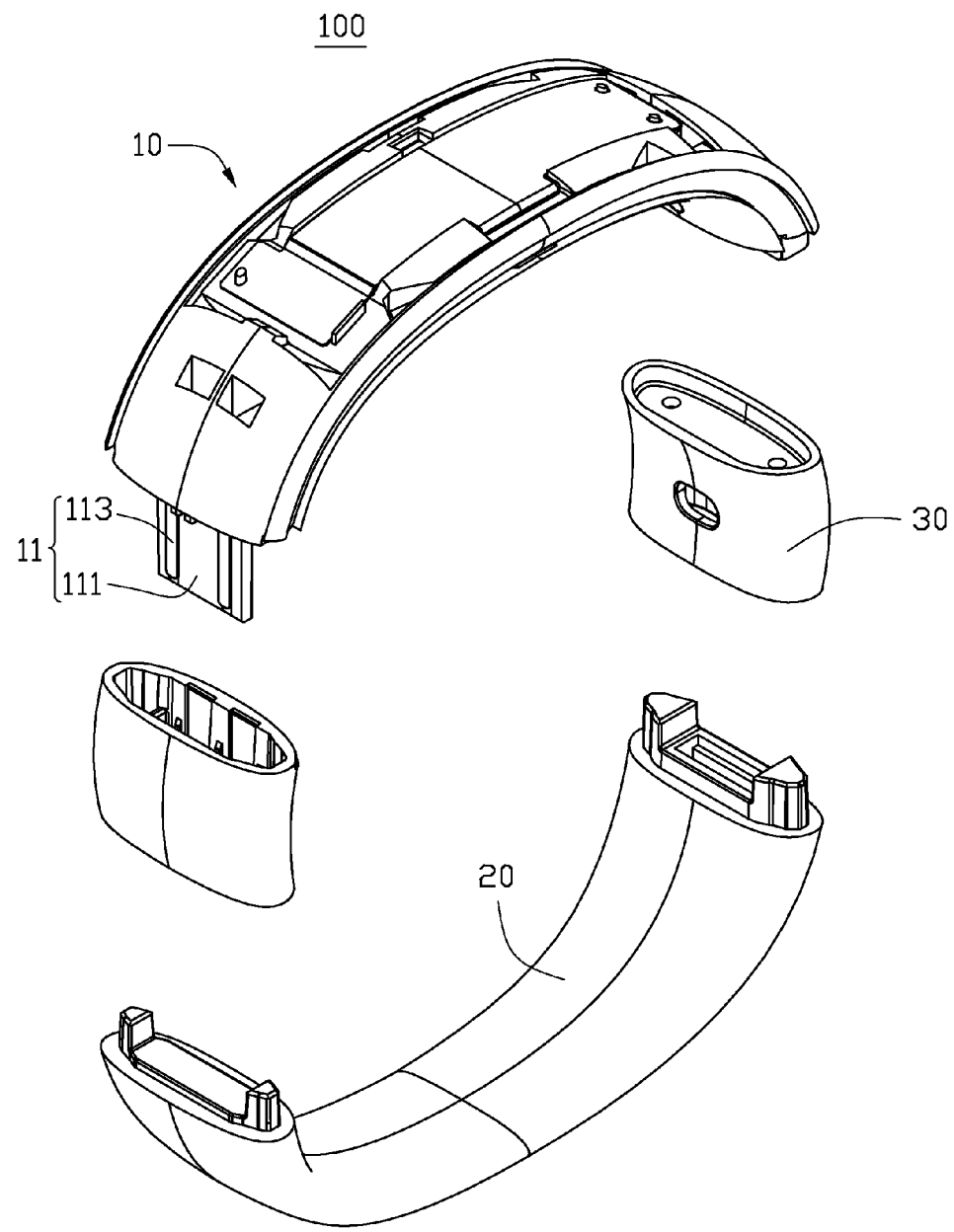
FIG. 2 is an exploded view of the portable wireless communication device shown in FIG. 1.

FIG. 2 illustrates an exploded view of the portable wireless communication device 100 shown in FIG. 1. The main body 10 includes a connector 11 mounted to one end of the main body 10, and configured to detachably housed within one of the two connecting portions 30.

The connector 11 is configured to charge the portable wireless communication device 100 by electronically coupling a power source (not shown) to the portable wireless communication device 100. The connector 11 includes a plurality of pins 113, one of the pins 113 is configured to serve as a radiation portion of an antenna to receive/send wireless signals when the connector 11 is electronically uncoupled with the power source.

In one embodiment, the connector 11 is an USB connector (data pins, such as positive differential pin and negative differential pin of the USB connector are not shown in FIGS. 1-2) which further includes a housing 111 configured to house and mount the pins 113.

Figure 3:
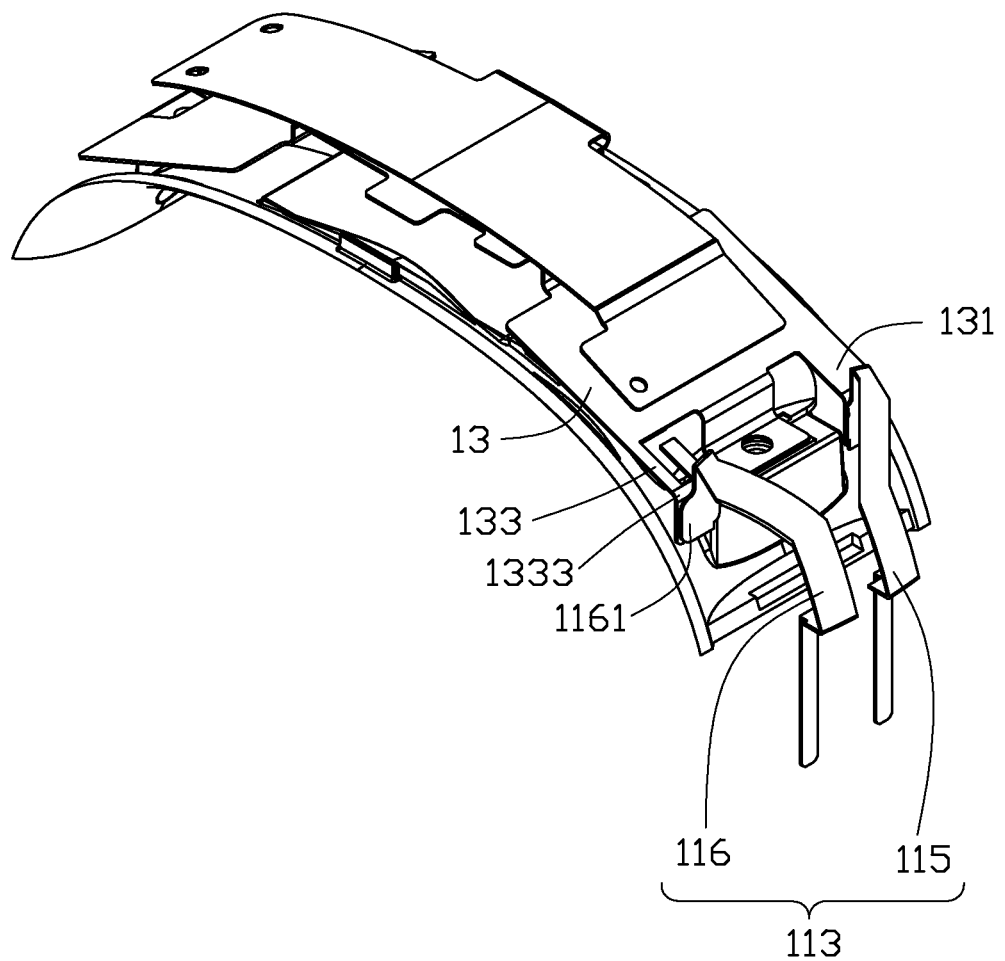
FIG. 3 is an isometric view of a part of a main body of the portable wireless communication device shown in FIG. 1.

FIG. 3 illustrates a part of the main body 10 of the portable wireless communication device 100 shown in FIG. 1. A printed circuit board 13 is also included that is received in the main body 10. The printed circuit board 13 includes a positive connecting terminal 131 and a negative connecting terminal 133. The pins 113 includes a power pin 115 electronically coupled to the positive connecting terminal 131 and a ground pin 116 electronically coupled to the negative connecting terminal 133.

Figure 4:
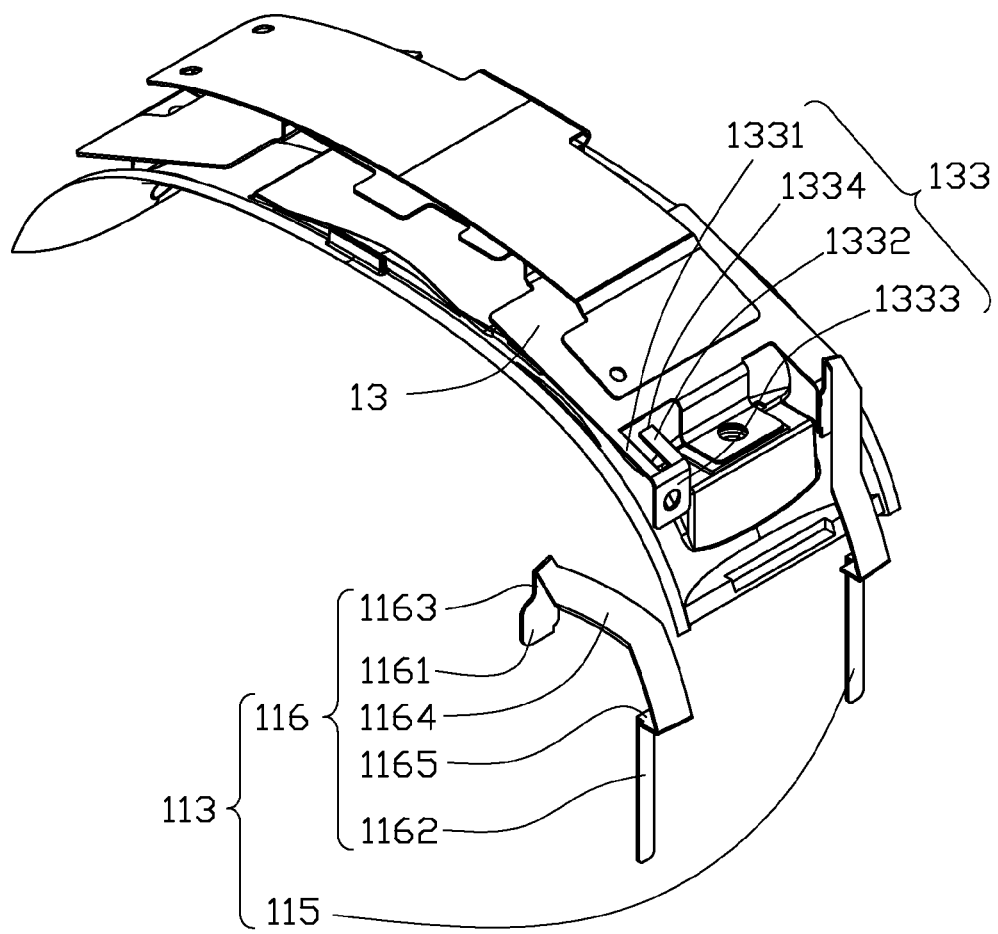
FIG. 4 is similar to FIG. 3, but showing a ground pin is exploded from the main body shown in FIG. 3.

FIG. 4 is similar to FIG. 3, but showing the ground pin 116 is exploded from the main body 10 shown in FIG. 3. As illustrated, the negative connecting terminal 133 includes a first section 1331, a second section 1332 and a third section 1333 coupled between the first and second sections 1331 and 1332. The first section 1331 is configured to be grounded. The third section 1333 is configured to electronically couple to the ground pin 116 (also see FIG. 3). The second section 1332 is configured to feed current signals to the ground pin 116 via the third section 1333.

The first and second section 1331 and 1332 are parallel to each other and are positioned at a same plane. The third section 1333 is a planner sheet, and is positioned in a plane that is substantially perpendicular to a plane in which the first and second sections 1331 and 1332 are positioned.

In one embodiment, the second section 1332 includes a feed-in point 1334 defined at one end of the second section 1332 opposite the third section 1333. The feed-in point 1334 can be electronically coupled to a radio frequency circuit (not shown) via a cable, a micro-strip, or an elastic sheet for example, such that the feed-in point 1334 can receive current signals from the radio frequency circuit, and feed the current signals to the ground pin 116, to excite the ground pin 116.

The ground pin 116 is a metal strip which includes a first arm 1161 and a second arm 1162. The first arm 1161 is electronically coupled to the third section 1333 of the negative connecting terminal 133 (also see FIG. 3), and is parallel to the second arm 1162. The second arm 1162 is configured to contact with an external connector mating with the connector 11.

In detail, the ground pin 116 further includes a third arm 1163, a fourth arm 1164, and a fifth arm 1165 all of which are connected sequentially. The third arm 1163 continuously extends from the first arm 1161, and an acute angle is formed between the third arm 1163 and the fourth arm 1164. Another acute angle is formed between the fourth arm 1164 and the fifth arm 1165, and the fifth arm 1165 is substantially perpendicular to the second arm 1162.

In one embodiment, the power pin 115 is substantially symmetrical to the ground pin 116.

In use, when the connector 11 is electronically coupled to a power source via another connector mating with the connector 11, the portable wireless communication device 100 can be charged by the power source via the connector 11. For example, when the connector 11 is electronically coupled to a computer via an USB connector, the portable wireless communication device 100 can get power from the computer by the ground pin 116 and power pin 115 of the connector 11. In addition, the portable wireless communication device 100 can communicate with the computer to share information with the computer via the connector 11. At this time, the feed-in point 1334 does not feed current signals to the ground pin 116 (e.g. by the control of a controller of the portable wireless communication device). When the connector 11 is uncoupled to the power source, the feed-in point 1334 feed current signals to the ground pin 116 (e.g. by the control of a controller of the portable wireless communication device), such that the ground pin 116 can receive/send wireless signals. In other words, at this time, the first section 1131 of the negative connecting terminal 113 serves as a grounding portion of an antenna; the second section 1132 of the negative connecting terminal 113 serves as a feeding portion of the antenna; and the ground pin 116 serves as a radiation portion of the antenna. Therefore, an additional antenna is not needed, such that the size of the portable wireless communication device 100 is effectively decreased.

Figure 5:
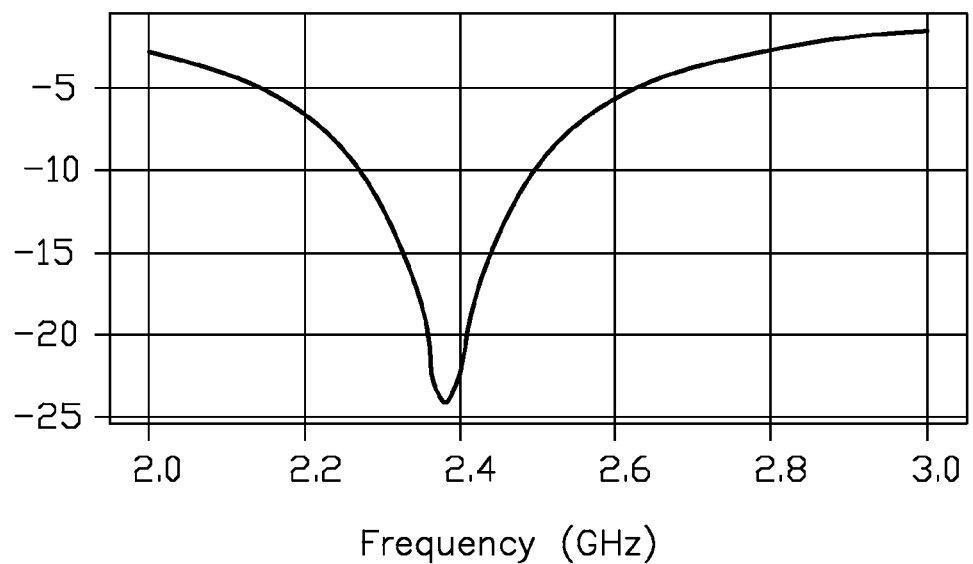
FIG. 5 is a diagram showing return loss (RL) measurement of the ground pin shown in FIG. 4 when the ground pin serves as an antenna.

FIG. 5 illustrates a diagram showing return loss (RL) measurement of the ground pin 116 when the ground pin 116 serves as a radiation portion of the antenna. It can be derived from FIG. 5 that the antenna can receive/send wireless signals at Bluetooth frequency band from about 2.4 GHz to about 2.484 GHz, such that the portable wireless communication device 100 can communicate with Bluetooth devices to transmit various signal such as time, heartbeats, and calendar alert. It can be understood that, in another embodiment, by changing the shape and size of the ground pin 116 and the negative connecting terminal 133, the operation frequency of the antenna can be adjusted, such that the antenna can utilized in another communication systems, such as global position system (GPS).

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable wireless communication device comprising: a main body comprising a first end with a connector and a second end; a strap comprising a first end and a second end; and a first connecting portion detachably coupled to the first end of the main body and the first end of the strap; a second connecting portion detachably coupled to the second end of the main body and the second end of the strap; the connector configured to charge the portable wireless communication device by electronically coupling a power source to the portable wireless communication device, the connector comprising a plurality of pins, one of the pins configured to serve as a radiation portion of an antenna to receive/send wireless signals when the connector is electronically uncoupled to the power source.

2. The portable wireless communication device of claim 1, further comprising a printed circuit board, wherein the printed circuit board comprises a positive connecting terminal and a negative connecting terminal; the pins comprises a ground pin electronically coupled to the negative connecting terminal, and a power pin electronically coupled to the positive connecting terminal.

3. The portable wireless communication device of claim 2, wherein the negative connecting terminal comprises a first section, a second section, and a third section coupled between the first section and the second section; the first section is configured to be grounded; the third section is configured to electronically couple to the ground pin; the second section is configured to feed current signals to the ground pin via the third section.

4. The portable wireless communication device of claim 3, wherein the first section and the third section are parallel to each other and are positioned at a same plane, the third section is a planner sheet, and is positioned in a plane that is substantially perpendicular to a plane in which the first section and the second section are positioned.

5. The portable wireless communication device of claim 3, wherein the ground pin is a metal strip which comprises a first arm, and a second arm; the first arm is electronically coupled to the third section of the negative connecting terminal, and is parallel to the second arm; the second arm is configured to contact with an external connector.

6. The portable wireless communication device of claim 5, wherein the ground pin further comprises a third arm, a fourth arm, and a fifth arm all of which are connected sequentially; the third arm continuously extends from the first arm; an acute angle is formed between the third arm and the fourth arm; another acute angle is formed between the fourth arm and the fifth arm; the fifth arm is substantially perpendicular to the second arm.

7. The portable wireless communication device of claim 1, wherein the connector is a USB connector.

8. The portable wireless communication device of claim 1, wherein the connector is mounted to one end of the main body, and is configured to detachably housed within one of the first and second connecting portions.

9. A portable wireless communication device comprising: a main body; a strap; and two connecting portions detachably mounted to two opposite ends of the main body respectively; wherein the strap is detachably coupled to the two connecting portions respectively; a printed circuit board comprising a feed-in point configured to feed current signals; and a connector configured to charge the portable wireless communication device by electronically coupling a power source to the portable wireless communication device, the connector comprising a plurality of pins; one of the plurality of pins electronically coupled to the feed-in point, and configured to receives the current signals from the feed-in point to serve as a radiation portion of an antenna when the connector is uncoupled to the power source.

10. The portable wireless communication device of claim 9, wherein the printed circuit board comprises a positive connecting terminal and a negative connecting terminal; the pins comprises a ground pin electronically coupled to the negative connecting terminal, and a power pin electronically coupled to the positive connecting terminal.

11. The portable wireless communication device of claim 10, wherein the negative connecting terminal comprises a first section, a second section, and a third section coupled between the first section and the second section; the first section is configured to be grounded; the third section is configured to electronically couple to the ground pin; the feed-in point is defined at an end of the second section opposite the third section.

12. The portable wireless communication device of claim 11, wherein the first section and the third section are parallel to each other and are positioned at a same plane, the third section is a planner sheet, and is positioned in a plane that is substantially perpendicular to a plane in which the first section and the second section are positioned.

13. The portable wireless communication device of claim 11, wherein the ground pin is a metal strip which comprises a first arm, and a second arm; the first arm is electronically coupled to the third section of the negative connecting terminal, and is parallel to the second arm; the second arm is configured to contact with an external connector.

14. The portable wireless communication device of claim 13, wherein the ground pin further comprises a third arm, a fourth arm, and a fifth arm all of which are connected sequentially; the third arm continuously extends from the first arm; an acute angle is formed between the third arm and the fourth arm; another acute angle is formed between the fourth arm and the fifth arm; the fifth arm is substantially perpendicular to the second arm.

15. The portable wireless communication device of claim 9, wherein the connector is a USB connector.

16. The portable wireless communication device of claim 9.

17. A portable wireless communication device comprising:
a main body comprising a first end with a connector and a second end;
a strap comprising a first end and a second end; and
a first connecting portion detachably coupled to the first end of the main body and the first end of the strap;
a second connecting portion detachably coupled to the second end of the main body and the second end of the strap;
the connector configured to charge the portable wireless communication device by electronically coupling a power source to the portable wireless communication device, the connector comprising a plurality of pins, one of the pins configured to serve as a radiation portion of an antenna to receive/send wireless signals when the connector is electronically uncoupled to the power source.

18. The portable wireless communication device of claim 17, wherein the connector is mounted to one of the first and second ends of the main body, and is detachably housed within one of the first and second connecting portions.

* * * * *